United States Patent [19]  [11] 4,182,852
Shiga et al.  [45] Jan. 8, 1980

[54] PROCESS FOR REFINING A HOMOPOLYMER OF COPOLYMER OF PROPYLENE

[75] Inventors: Akinobu Shiga; Kiyoshi Matsuyama; Masahiro Kakugo; Takatoshi Suzuki, all of Niihama, Japan

[73] Assignee: Sumitomo Chemical Company, Limited, Osaka, Japan

[21] Appl. No.: 881,314

[22] Filed: Feb. 27, 1978

[30] Foreign Application Priority Data

Feb. 25, 1977 [JP] Japan .................................. 52-20751

[51] Int. Cl.$^2$ ................................................ C08F 6/28
[52] U.S. Cl. .................................... 528/494; 526/142; 526/351; 528/495; 528/496
[58] Field of Search ........................ 528/494, 495, 496

[56] References Cited

U.S. PATENT DOCUMENTS

| 3,074,921 | 1/1963 | Carter | 528/496 |
|---|---|---|---|
| 4,053,697 | 10/1977 | Asada et al. | 526/142 |

FOREIGN PATENT DOCUMENTS

| 39-20501 | 2/1964 | Japan. |
| 46-37490 | of 1971 | Japan. |
| 48-79589 | 11/1973 | Japan. |
| 51-1274 | of 1976 | Japan. |
| 51-1139886 | 12/1976 | Japan. |
| 52-2003679 | 1/1977 | Japan. |
| 1391068 | 4/1975 | United Kingdom. |

*Primary Examiner*—Stanford M. Levin

*Attorney, Agent, or Firm*—Sughrue, Rothwell, Mion, Zinn and Macpeak

[57] ABSTRACT

In a process for producing a propylene homopolymer or copolymer which comprises polymerizing propylene or copolymerizing propylene and at least one other unsaturated hydrocarbon monomer in liquid propylene using a catalyst comprising activated titanium trichloride and an organo-aluminum compound, the activated titanium trichloride being prepared by reducing titanium tetrachloride with an organo-aluminum compound followed by activation, introducing the polymer slurry produced into the top of a counter-current washing tower, and washing the slurry by bringing the slurry into counter-current contact with liquid propylene which is introduced into the bottom of the washing tower, the improvement which comprises refining the homopolymer or copolymer of propylene by feeding (a) an alcohol having 3 to 8 carbon atoms in a molar amount of about 0.1 to about 10 times the molar amount of the organo-aluminum compound in the slurry, or (b) a mixture of an alcohol having 3 to 8 carbon atoms and an epoxide, the molar amount of the alcohol being about 0.1 to about 10 times the molar amount of the organo-aluminum compound in the slurry and the molar amount of the epoxide compound being about 0.1 to about 3 times the molar amount of the organo-aluminum compound in the slurry, to a part of the washing tower, thereby simultaneously deactivating the catalyst and removing the catalyst and the propylene homopolymer or copolymer dissolved in the polymer slurry.

4 Claims, 1 Drawing Figure

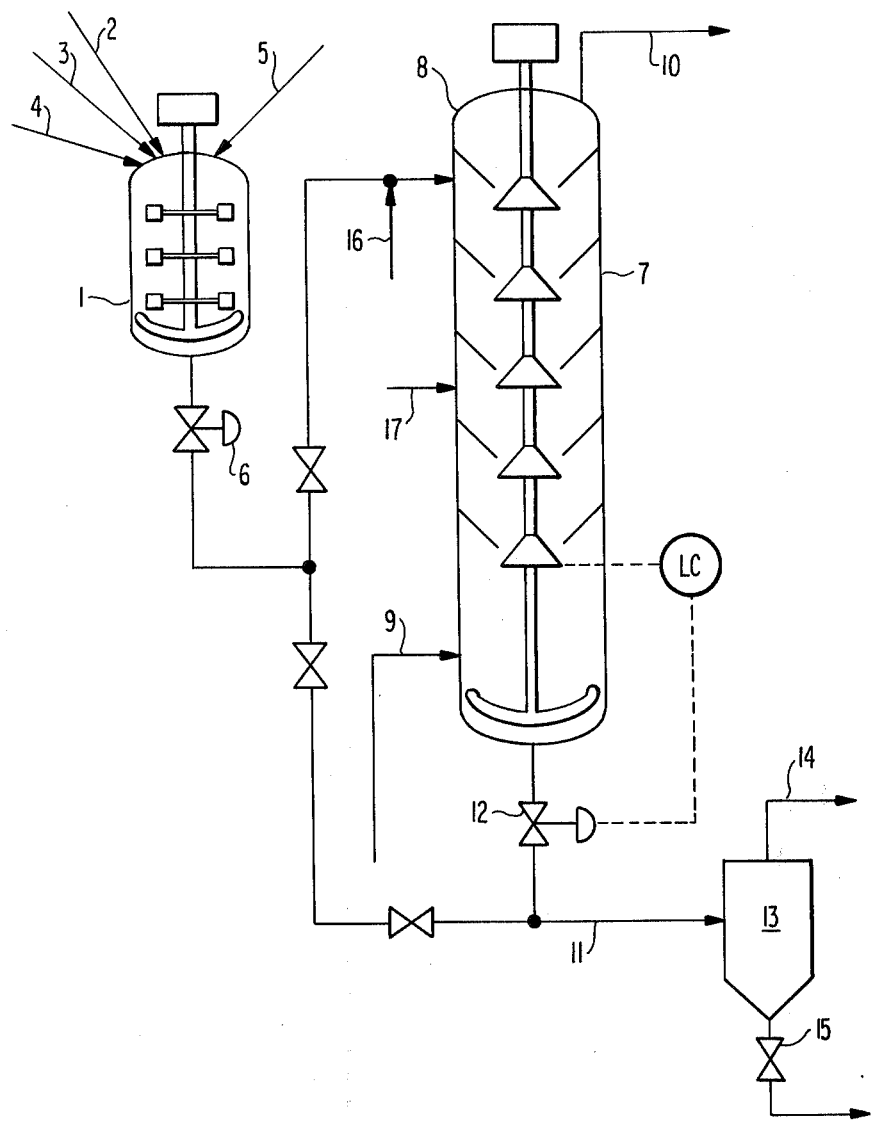

PROCESS FOR REFINING A HOMOPOLYMER OF COPOLYMER OF PROPYLENE

BACKGROUND OF THE INVENTION

1. Field of the Invention

The present invention relates to a process for refining homopolymers and copolymers of propylene. More particularly, it relates to a process for refining homopolymers or copolymers of propylene, which are produced by polymerization or copolymerization of propylene in liquid propylene (referred to as "bulk polymerization" hereinafter), in an industrially advantageous manner.

2. Description of the Prior Art

Bulk polymerization is well-known and widely applied in industry. In comparison with the polymer slurry produced using conventional suspension (or solvent) polymerization (referred to as "conventional solvent polymerization" hereinafter) in which the polymerization is generally carried out in a liquid saturated hydrocarbon solvent having 5 or more, preferably 5 to 7, carbon atoms, the polymer slurry produced using bulk polymerization is quite advantageous in that separation of the polymer produced from the solvent can be carried out very easily by merely subjecting the slurry to reduced pressure because the unsaturated hydrocarbon monomers (mainly propylene) used as a polymerization solvent have such a high vapor pressure that they are easily vaporized.

In general, however, polymers obtained by this bulk polymerization process have some disadvantages because they contain large amounts of both polymers soluble in boiling n-heptane as a by-product and catalyst residues. Accordingly, such polymers have poorer physical properties, as described hereinafter.

As to polymers soluble in boiling n-heptane, when bulk polymerization is carried out, for example, with a combined catalyst of titanium trichloride and triethylaluminum, the produced polymer contains only 75 to 85% by weight of boiling-n-heptane insoluble polymer. Also, when a combined catalyst of titanium trichloride and diethylaluminum chloride is used, the content of boiling n-heptane insoluble polymer is 85 to 95% by weight.

Such polymers containing large amounts of boiling n-heptane soluble polymers have poorer physical properties, particularly stiffness and tackiness. Therefore, these polymers can be used for molding but they are not suitable for films and fibers requiring relatively good physical properties.

As to the catalyst residues, on the other hand, a reduction in the amount of the catalyst residue in bulk polymerization is inherently possible, since the polymerization has a high polymerization rate and can be operated at a high level of catalyst efficiency as compared with conventional solvent polymerization. However, a very large amount of organo-aluminum compounds must be used in order to maintain high levels of catalyst efficiency and selectivity. For example, when bulk polymerization of propylene is carried out in liquid propylene using highly active titanium trichloride and diethylaluminum chloride, as is disclosed in Japanese Patent Application (OPI) No. 34478/1972, high levels of activity and selectivity can not be maintained unless 0.2 g or more of diethylaluminum chloride per kg of liquid propylene is used. When large amounts of the organo-aluminum compound remain in the polymer as a catalyst residue, the produced polymers have a markedly reduced stability, and are easily degraded by heat, thus resulting in foaming and coloration. Consequently, such polymers can not be used when high quality is desired.

In order to obtain high quality propylene polymers, therefore, the boiling n-heptane soluble polymers and catalyst components remaining as residue must be removed.

Extensive investigations were made to improve the quality of such polymers since for a polymer slurry produced using bulk polymerization, polymers soluble in the slurry, residual catalyst dissolved in the slurry and a part of residual catalyst deposited from the slurry can easily be separated from the slurry in a counter-current washing tower using liquid propylene as a washing solvent. This led to an industrially advantageous process for producing homopolymers and copolymers of propylene (i.e., as described in Japanese Patent Application (OPI) Nos. 79589/1975, 102681/1975, 139886/1976, 3679/1977).

With this process, however, there is the possibility of problems occurring when much higher quality levels than required commercially at present are desired.

For example, in the practical use of the above process, high molecular weight polymers are easily produced in the washing tower. Since film grade polypropylenes account for a large percentage of the polypropylene produced, films obtained from such polypropylenes have many fish eyes due to the high molecular weight polymers, and thus the transparency of the films is too poor for commercial use.

SUMMARY OF THE INVENTION

An object of the present invention is to provide an improved process for increasing the qualities of polypropylene over that achievable in the process described above.

The present invention provides a process for producing a refined propylene homopolymer or copolymer comprising polymerizing propylene or copolymerizing propylene and at least one other unsaturated hydrocarbon monomer in liquid propylene using a catalyst comprising activated titanium trichloride and an organo-aluminum compound, the activated titanium trichloride being prepared by reducing titanium tetrachloride with an organo-aluminum compound followed by activation, to produce a polymer slurry; introducing the polymer slurry produced into the top of a counter-current washing tower; and washing the polymer slurry by counter-currently contacting the polymer slurry with liquid propylene which is introduced into the bottom of the washing tower, while feeding (a) an alcohol having 3 to 8 carbon atoms in a molar amount of about 0.1 to about 10 times the molar amount of the organo-aluminum compound in the slurry, or (b) a mixture of an alcohol having 3 to 8 carbon atoms in a molar amount of about 0.1 to about 10 times the molar amount of the organo-aluminum compound in the polymer slurry and an epoxide in a molar amount of about 0.1 to about 3 times the molar amount of the organo-aluminum compound in the slurry to a part of the washing tower, thereby simultaneously deactivating the catalyst and removing the catalyst and propylene homopolymers or copolymers dissolved in the polymer slurry.

BRIEF DESCRIPTION OF THE DRAWING

The FIGURE illustrates a simple flow sheet of an embodiment of the present invention.

DETAILED DESCRIPTION OF THE INVENTION

Various kinds of alcohols, ketones, and diketones are well known as catalyst deactivators. These deactivators are also used in bulk polymerization (e.g., as described in Japanese Patent Publication Nos. 37490/1971 and 1274/1976).

However, the object of these well-known processes is to remove catalyst residues from the polymers by extraction, and a large amount of alcohol is necessary to remove the titanium component of the catalyst by extraction with lower hydrocarbons. In Japanese Patent Publication No. 37490/1971, for example, alcohols in an amount of 5% by volume based on volume of the lower hydrocarbons are used.

Since, therefore, polymers obtained in this conventional process contain a large amount of alcohol, a large amount of washing solvent and, in some cases, a dryer becomes necessary to wash off the alcohol. Further, this process is disadvantageously complicated since processes for decomposition and extraction of the catalyst are further required.

After extensive investigations to overcome these difficulties, a process for obtaining polymers having markedly higher quality levels than those of commercially available products in a simpler manner and at a lower cost than the well-known processes has been discovered. Thus, the present invention has been achieved.

In the present invention, the formation of high molecular weight polymers in the washing tower is completely inhibited, and organo-aluminum components easily adsorbed by the polymers are readily separated therefrom and substantially removed by the countercurrent washing with liquid propylene, which results in a great reduction in ash content. Thus, the polymers obtained by the present invention have a high quality level suitable for use as films and fibers.

Further, by the practice of the present invention, processes previously required for decomposition and extraction of the catalyst can be omitted and thus a very simple process has been developed.

The titanium compounds used in the present invention as a catalyst preferably have a high activity and narrow particle size distribution. For example, the catalyst of the present invention comprises β-titanium trichloride produced by the reduction of titanium tetrachloride with an organo-aluminum compound, as a material for the activated titanium catalyst, and the β-titanium trichloride is treated with a complexing agent, an organo-aluminum compound, titanium tetrachloride or combination thereof. This catalyst is at least three times more active than a catalyst produced by simple heat treatment of β-titanium trichloride according to well-known methods (for example, as disclosed in Japanese Patent Publication No. 20501/1964). That is to say, the activity of the present catalyst, as defined by the catalyst efficiency according to the following equation, is as high as 8,000 or more.

$$\text{Catalyst Efficiently} = \frac{\text{Amount (g) of Polymerization per Titanium Trichloride Composition}}{\text{Titanium Trichloride Composition}}$$

More particularly, the solid catalyst obtained, for example, by the process described in U.S. Pat. No. 3,960,765 may be used.

Further, in the practice of the present invention, a highly activated catalyst which is obtained according to the process described in Japanese Patent Application (OPI) No. 34478/1972, that is, by treatment of β-titanium trichloride with a complexing agent (e.g., an ether) and then titanium tetrachloride, may also be used.

The catalyst system used in the present invention comprises the activated titanium compound described above and an organo-aluminum compound. The catalyst system of the present invention may, however, also contain well-known third components such as amines, ethers, esters, sulfur, halogens, benzene, azulene derivatives, organic or inorganic nitrogen compounds, phosphorus compounds and the like.

Well-known catalysts, other than the essential catalyst in the present invention, for example, commercially available catalysts produced by the reduction of titanium tetrachloride with metallic aluminum followed by activation by pulverizing (e.g., titanium trichloride AA produced by Stauffer Co., Ltd.), have a broad particle size distribution. Consequently, when they are used in the present invention, a large part of the catalyst flows out of the washing tower together with the washing liquor, which results in a large loss of catalyst. In addition, since many difficulties with respect to pipes and other equipment occur, smooth operation of the plant becomes impossible. These aspects are illustrated in the comparative examples given hereinafter.

Other well-known catalysts, for example those produced by reduction of titanium tetrachloride with an organo-aluminum compound followed by heat treatment, have a good particle size distribution but have a poor activity (an activity similar to that of titanium trichloride AA). Consequently, because of the poor catalyst efficiency even in bulk polymerization, the final products produced as with titanium trichloride AA, have a poorer appearance than that of commercial products and therefore they have poor marketability.

Examples of alcohols used in the present invention include aliphatic alcohols or alicyclic alcohols having 3 to 8 carbon atoms, for example n-propanol, isopropanol, n-butanol, sec-butanol, tert-butanol, n-amyl alcohol, sec-amyl alcohol, cyclopentanol, n-hexanol, 1-methylpentanol, 2-methylpentanol, 1-ethylbutanol, cyclohexanol, 2-methylcyclopentanol, n-heptanol, 2-methylcyclohexanol, 2-methylhexanol, n-octanol, 2-ethylhexanol and the like. Particularly, alcohols having at least one hydrocarbon group at the α- or β-position relative to the hydroxyl group have a superior ability to wash the catalyst from polymer. In this respect, isopropanol, isobutanol, sec-amyl alcohol, cyclohexanol and 2-ethylhexanol are preferably used.

The amount of the alcohol used depends upon the amount of organo-aluminum compound in the polymer slurry. When the amount of alcohol is too small, high molecular weight polymers are produced in the washing tower. As a result the properties of the polymer are extremely poor.

When the amount of the alcohol is too large, solid matter containing an organo-aluminum compound, which is insoluble in liquid propylene, is produced, and washing the catalyst from the polymer becomes difficult. As a result, the polymer produced has an extremely poor appearance and stability. When the amount of alcohol is excessively large, a large amount of the alcohol is adsorbed on the polymer, which makes it difficult to remove the alcohol in the counter-current washing with liquid propylene.

Accordingly, the alcohol is used in a molar amount of about 0.1 to about 10 times, preferably 0.5 to 5 times, based on the molar amount of the organo-aluminum compound.

The alcohol can be fed to the washing tower as it is or as a dilute solution in liquid propylene. Alternatively, the alcohol may be fed to the polymer slurry in a feed line or to liquid propylene used as a washing liquor.

In the present invention, the effects of the treatment are marked and high-quality products can be obtained using the alcohol alone as a deactivator. However, the effects of the treatment can be enhanced even further by adding an epoxide to the alcohol. The epoxide has an ability to deactivate active hydrogen halide generated on catalyst decomposition and, in some catalyst systems, the extraction effect is enhanced.

Suitable epoxides which can be used include alkylene oxides and glycidyl ethers such as ethylene oxide, propylene oxide, butylene oxide, epichlorohydrin, methyl glycidyl ether, ethyl glycidyl ether, butyl glycidyl ether and the like. Of these epoxides, propylene oxide, butylene oxide, epichlorohydrin and butyl glycidyl ether are particularly preferred.

The epoxide is used in a molar amount of about 0.1 to about 3 times the molar amount of the organo-aluminum compound.

In the present invention, at least one other unsaturated hydrocarbon monomer can be copolymerized with propylene and examples thereof include α-olefins having 6 or less carbon atoms (particularly α-olefins such as ethylene, butene-1, etc.) and mixtures thereof.

The present invention is quite advantageous and some of the characteristics of the present invention are set forth below.

(1) Polymerization or copolymerization of propylene is carried out in liquid propylene using a catalyst system with extremely high catalyst efficiency which contains an organo-aluminum compound and an activated titanium compound, the activated titanium compound being produced by reduction of titanium tetrachloride with an organo-aluminum compound followed by activation.

(2) Polymers soluble in the polymer slurry, and residual catalyst dissolved in and/or deposited from the slurry, can easily be separated in the counter-current washing tower using liquid propylene as a washing liquid.

(3) Formation of high molecular weight polymers which decrease the quality of the product can be prevented completely in the counter-current washing tower.

(4) Refined propylene homopolymers and copolymers are obtained by subjecting the polymer slurry to the above-described extraction and washing process.

Turning now to the Figure, the Figure illustrates one example of the process of the present invention.

Liquid propylene, an unsaturated hydrocarbon monomer (e.g., ethylene), a molecular weight regulating agent (e.g., hydrogen) and a catalyst are fed to a polymerization reactor 1 through lines 2, 3, 4 and 5, respectively.

The polymerization is carried out at about 30° to about 100° C. and under a pressure at which the propylene is maintained liquid. The produced polymer slurry is fed, which can be fed batchwise but preferably is fed continuously, from the reactor 1 to the top 8 of a counter-current washing tower 7 through a valve 6 (referred to as "top feed" hereinafter). Liquid propylene which does not contain any soluble polymers (mainly amorphous polymers), preferably fresh propylene, is fed to the bottom of the tower 7 through a line 9 (referred to as "bottom feed" hereinafter).

An alcohol or a mixture of an alcohol and an epoxide is fed, as it is or diluted with liquid propylene, to the tower through a line 9, 16 or 17. The alcohol or a mixture of the alcohol and epoxide is most preferably fed through a line 17 to bring the alcohol or mixture into intimate contact with the polymer thereby enhancing the washing effect achieved. Polymers which are soluble in the slurry and reaction products between the residual catalyst and the alcohol are selectively discharged through an overflow line 10 and introduced into a process for recovering amorphous polymers. The polymer slurry is counter-currently contacted with the liquid propylene of the bottom feed of the tower 7. The slurry insoluble polymer is deposited at the bottom end, when the pressure is released to about atmospheric pressure by the action of a valve 12 interlocked with a level (or concentration) controller LC, the polymer is discharged through a line 11 and introduced into a flash tank 13.

The monomers containing mainly liquid propylene which are gaseous at atmospheric pressure are vaporized in the flash tank 13 and sent to a refining process through a line 14.

The polymer separated in the flash tank 13 is sent, as it is, or, if necessary, through aftertreatments such as catalyst decomposition, to a hopper or granulator through a valve 15.

In the present invention, some of the functions of the counter-current washing tower are as follows:

(1) Liquid propylene in the top feed is separated and discharged together with the bottom feed rising from the bottom of the tower, through the overflow line at the top of the tower.

(2) The insoluble polymer in the top feed is washed with the bottom feed and discharged together with a part of the bottom feed from the bottom of the tower.

The structure of the counter-current washing tower, preferably is that as disclosed in Japanese Patent Application (OPI) No. 79589/1975 the above-described requirements are met.

The present invention will be illustrated in more detail by reference to the following examples and comparative examples, which are not however to be interpreted as limiting the present invention. Unless otherwise indicated, all parts, percents, ratios and the like are by weight.

EXAMPLE 1

(1) Preparation of Catalyst (1) Preparation I (Preparation of reduction product)

After the atmosphere in a 200-liter reactor was replaced with argon, dry hexane (40 liters) and titanium tetrachloride (10 liters) were added thereto and the mixed solvent was kept at −5° C. A solution comprising dry hexane (30 liters) and ethylaluminum sesquichloride (23.2 liters) was added dropwise to the mixed solvent while maintaining the temperature of the reaction system at −3° C. or less. Stirring of the reaction system was continued for 2 hours at the same temperature. After the reaction was finished and the system was allowed to stand, the reduction product was separated from the liquid portion at 0° C. and washed twice with hexane (40 liters). Thus, 16 kg of a reduction product was obtained.

(2) Preparation II

The reduction product obtained in Preparation I above was slurried in n-decane and the slurry concentration was adjusted to 0.2 g/cc. The resulting slurry was heat-treated at 140° C. for 2 hours. After the reaction was finished, the supernatant liquid was discharged and the product was washed twice with hexane (40 liters) to obtain Titanium Trichloride Composition (A).

(3) Preparation III 11 kg of Titanium Trichloride Composition (A) prepared in Preparation II above was slurried in toluene (55 liters), and iodine and diisoamyl ether were added thereto so that the molar ratio of Titanium Trichloride Composition (A) to $I_2$ to diisoamyl ether was 1:0.1:1.0. The reaction was carried out at 80° C. for 1 hour to obtain Titanium Trichloride Solid Catalyst (B).

(2) Polymerization of Propylene and Refining of Produced Polymer

Liquid propylene (1500 kg/hr), the Titanium Trichloride Solid Catalyst (B) (40 g/hr) and diethylaluminum chloride (600 g/hr) were continuously fed to a 30-m³ polymerization reactor at 70° C. in the presence of hydrogen. Thus, propylene was polymerized using the flow method. During that time, the pressure in the reactor was 31 to 31.8 kg/cm²G, and the produced polymer slurry was discharged in order to keep the level in the reactor constant.

Under these conditions, the discharged polymer slurry comprised a solid polymer (600 kg/hr), an atactic polymer soluble in liquid propylene (12 kg/hr) and unreacted liquid propylene containing most of the aluminum compound charged (895 kg/hr).

This polymer slurry was continuously discharged from the bottom of the reactor and fed to the top 8 of the counter-current multistage washing tower 7 (as shown in the Figure).

The characteristics of the counter-current washing tower used were as follows:
 Diameter of tower—600 mm
 Height of tower—8200 mm
 Rotating axis has 10 conical plates.

Isobutanol (370 g/hr) as a deactivator was fed under pressure to the washing tower at the middle part 17 between the top and the bottom of the washing tower.

At the same time, refined liquid propylene (1100 kg/hr) at 61° to 64° C. was continuously fed to the reactor at the bottom 9 of the tower. Agitation in the tower was carried out at a very slow rate of 12 rpm. During this operation, the pressure in the tower was 26.1 to 27.0 kg/cm²G. The polymer deposited at the bottom of the tower was continuously discharged through a reducing valve 12 interlocked with a level controller LC and a line 11 into a flash tank 13.

At the top 10 of the tower, liquid propylene (1500 kg/hr) containing the aluminum component of the catalyst and the atactic polymer (12 kg/hr) was discharged, and it was introduced into a recovery process for the atactic polymer. Loss of the fine powdery solid polymer contained therein was 1% or less. Thus, the slurry discharged from the bottom of the tower was separated in the flash tank 13, and the refined powdery polymer was obtained from the bottom of the flash tank.

The polymer characteristics, such as residue extracted by boiling n-heptane (II%) and residual ash in the polymer and the film characteristics such as blocking of a film of 30μ thick [produced by extruding the polymer and a common additive (0.1% by weight of 2,6-di-t-butyl p-cresol as a stabilizer and 0.1% by weight of erusic acid as a slipper) through a 40 mmφ T-die], of the polymer produced were evaluated. The results of these tests in the examples and comparative examples are shown in Table 1 given hereinafter.

From the results shown in Table 1, it can be seen that the solid catalyst of the present invention has a high catalyst efficiency because of its high catalytic activity, and the amount of polymerization per unit weight of solid catalyst is as extremely high as about 15,000 g/g. Therefore, the refining process after polymerization is simplified, and the polymer treated in the washing tower of the present invention has the same ash content as that of the polymer obtained using the conventional complicated refining process.

The boiling n-heptane II% is as high as 98.5% or more. Moreover, in an extraction test using liquid propylene at 65° C. in autoclave, the residue extracted was substantially zero. Thus, it was found that the washing effect in the washing tower was substantially complete.

The qualities of a film obtained from this polymer are somewhat superior to those of commercially available films.

COMPARATIVE EXAMPLE 1

The same procedures as in Example 1 were carried out except that the washing was conducted without a deactivator. The results obtained are also shown in Table 1 given below.

From these results, in comparison with the polymer obtained in Example 1, the polymer obtained in Comparative Example 1 had a high ash content, but the film had a haze which was too poor and too many fish eyes for commercial use.

EXAMPLES 2 TO 5

The same procedures as in Example 1 were carried out except that the deactivators shown in Table 1 below were used in place of the isobutanol used in Example 1.

As shown by the results in Table 1 below, the results for both the polymerization and the film characteristics were substantially the same as those in Example 1.

COMPARATIVE EXAMPLE 2

The same procedures as in Example 1 were carried out except that the solid catalyst (prepared in Example 1) was replaced by a commercially available titanium trichloride (TiCl₃ AA produced by Toyo-Stauffer Co., Ltd.). The results obtained are also shown in Table 1 below. In this case, the catalyst efficiency was of course inferior to that in Example 1, and the boiling n-heptane II% of polymer, the ash content and the film characteristics were far poorer than those of the polymer obtained in Comparative Example 1.

Table 1

Characteristic Properties of Polymers and T-die Films Obtained Therefrom

| | Example 1 | Example 2 | Example 3 | Example 4 | Example 5 | Comparative Example 1 | Comparative Example 2 |
|---|---|---|---|---|---|---|---|
| Catalyst | | | | | | | |
| Type | Titanium Trichloride Solid Catalyst (B) | Titanium Trichloride Solid Catalyst (B) | Titanium Trichloride Solid Catalyst (B) | Titanium Trichloride Solid Catalyst (B) | Titanium Trichloride Solid Catalyst (B) | Titanium Trichloride Solid Catalyst (B) | $TiCl_3AA$ |
| Feed rate of titanium component (g/hr) | 40 | 40 | 40 | 40 | 40 | 40 | 180 |
| Feed rate of aluminum component (g/hr) | 600 | 600 | 600 | 600 | 600 | 600 | 600 |
| Washing | | | | | | | |
| Deactivator (feed rate g/hr) | Isobutanol (370) | n-Butanol (370) | Isopropanol (300) Propylene oxide (150) | Cyclohexanol (100) | 2-Ethylhexanol (100) B.G.E.* (100) | None | Isobutanol (370) |
| Deactivator supply position | Line 17 | Line 17 | Line 9 | Line 16 | Line 17 | | Line 17 |
| Polymerization Results | | | | | | | |
| Solid polymer in slurry (kg/hr) | 600 | 600 | 600 | 600 | 600 | 600 | 605 |
| Soluble polymer in slurry (kg/hr) | 12 | 12 | 12 | 12 | 12 | 12 | 68 |
| Catalyst efficiency (g/g) | 15,300 | 15,300 | 15,300 | 15,300 | 15,300 | 15,300 | 3,700 |
| Polymer Characteristics | | | | | | | |
| II (%) | 98.5 | 98.3 | 98.8 | 98.5 | 98.4 | 98.5 | 94 |
| T-Ash (ppm) | 50 | 94 | 42 | 45 | 35 | 110 | 170 |
| $TiO_2$ (ppm) | 22 | 39 | 17 | 20 | 14 | 40 | 132 |
| $Al_2O_3$ (ppm) | 13 | 50 | 10 | 13 | 8 | 44 | 23 |
| Pellet color | Good | Good | Good | Good | Good | Good | Yellow |
| Film Characteristics | | | | | | | |
| Blocking (g/100cm$^2$) | 12 | 15 | 13 | 18 | 18 | 15 | 44 |
| Haze (%) | 2.3 | 2.2 | 2.2 | 2.0 | 2.2 | 5.3 | 2.1 |
| Young's modulus (kg/cm$^2$) | 6,700 | 6,500 | 6,650 | 6,600 | 6,700 | 8,700 | 5,900 |
| Bubbles | None | None | None | None | None | None | Present |
| Fish eye | None | None | None | None | None | Many | Many |

*Butyl glycidyl ether

EXAMPLE 6

Copolymerization of propylene and ethylene was carried out in a 30-m³ polymerization reactor using a titanium trichloride solid catalyst prepared using the following process in place of the solid catalyst used in Example 1.

(1) Preparation of Catalyst (1) Preparation I (preparation of β-titanium trichloride)

After the atmosphere in a 200-liter reactor was replaced with argon, dry hexane (40 liters) and titanium tetrachloride (10 liters) were added thereto and the mixed solution was kept at −5° C.

A solution comprising dry hexane (30 liters) and diethylaluminum chloride (11.6 liters) was added dropwise to the mixed solution while maintaining the temperature of the reaction system at −3° C. or less. After the reaction was finished, stirring of the system was continued for an additional 30 minutes, heated to 70° C. and stirring was continued for an additional 1 hour.

After the reaction system was allowed to stand, β-titanium trichloride was separated from the liquid portion and washed three times with hexane (40 liters). Thus, 15 kg of a reduction product was obtained.

The Al content of the titanium trichloride was 4.60% by weight.

(2) Preparation (II) (preparation of Lewis-base treated solid)

The β-titanium trichloride obtained in Preparation I above was suspended in dry hexane (40 liters), and then diisoamyl ether was added thereto in a molar amount of 1.2 times the molar amount of the β-titanium trichloride. The mixture was then stirred at 40° C. for 1 hour.

After the reaction was finished, the supernatant liquid was discharged and the solid portion was washed three times with hexane (40 liters) and dried.

(3) Preparation III

The Lewis base treated solid (10 kg) prepared in Preparation II above was added to a solution of dry heptane (30 liters) and titanium tetrachloride (20 liters), and the mixture was treated at 70° C. for 2 hours.

After the reaction was finished, the supernatant liquid was discharged and the solid portion was washed three times with hexane (30 liters) and dried to obtain a titanium trichloride solid catalyst.

(2) Copolymerization of Propylene and Ethylene

Copolymerization of propylene and ethylene was carried out in a 30-m³ polymerization reactor using the titanium trichloride solid catalyst obtained in Preparation III above.

Copolymerization and washing were carried out in the same manner as in Example 1, except the following conditions were employed:

| Catalyst: | |
|---|---|
| Feed rate of titanium component | 50 g/hr |
| Feed rate of aluminum component | 600 g/hr |
| Feed rate of methyl methacrylate (as a third component) | 30 g/hr |
| Polymerization: | |
| Temperature | 60° C. |
| Pressure | 26 kg/cm$^2$G |
| Feed rate of liquid propylene | 1500 kg/hr |
| Feed rate of ethylene | 60 kg/hr |
| Washing: | |
| Propylene for washing | 52°–55° C. |
| Isobutanol (deactivator) | 400 g/hr |

The results obtained of the copolymerization were as follows:

| Solid polymer in polymer slurry | 400 kg/hr |
|---|---|
| Soluble polymer in polymer slurry | 15 kg/hr |
| Catalyst efficiency | 8,300 g/g |

The washed polymer contained 3% by weight of ethylene. The ash content of the polymer was very small as follows: total ash: 55 ppm; TiO$_2$: 32 ppm; Al$_2$O$_3$: 12 ppm. Superior film characteristics were obtained: Blocking 14 g/cm$^2$; Haze: 1.6%; Fish eye: none.

COMPARATIVE EXAMPLE 3

The same procedures as in Example 6 were carried out except that the washing was carried out without a deactivator.

The total ash of the polymer produced was 108 ppm. The properties such as pellet color were approximately the same as in Example 6, but the film obtained therefrom had many fish eyes and a haze of as poor as 6.2% so that is could not be used as a commercial product.

While the invention has been described in detail and with reference to specific embodiments thereof, it will be apparent to one skilled in the art that various changes and modifications can be made therein without departing from the spirit and scope thereof.

What is claimed is:

1. In a process for producing a homopolymer or copolymer of propylene comprising polymerizing propylene or copolymerizing propylene and at least one other unsaturated hydrocarbon monomer in liquid propylene using a catalyst containing activated titanium trichloride and an organo-aluminum compound, the activated titanium trichloride being prepared by reducing titanium tetrachloride with an organo-aluminum compound followed by activation, to produce a polymer slurry; introducing the polymer slurry produced into the top of a counter-current washing tower; and washing the polymer slurry by counter-currently contacting the polymer slurry with liquid propylene introduced into the bottom of the washing tower, the improvement which comprises refining the homopolymer or copolymer of propylene by feeding (a) an alcohol having 3 to 8 carbon atoms in a molar amount of about 0.1 to about 10 times the molar amount of the organo-aluminum compound in the slurry, or (b) a mixture of an alcohol having 3 to 8 carbon atoms in a molar amount of about 0.1 to about 10 times the molar amount of the organo-aluminum compound in the slurry and an epoxide in a molar amount of about 0.1 to about 3 times the molar amount of the organo-aluminum compound in the slurry, to a part of said washing tower, thereby simultaneously deactivating the catalyst and removing the catalyst and the homopolymer or copolymer of propylene dissolved in the polymer slurry.

2. The process according to claim 1, wherein said alcohol having 3 to 8 carbon atoms has at least one hydrocarbon group linked to the carbon atom in the α- or β-position to the hydroxyl group.

3. The process according to claim 2, wherein the alcohol is selected from the group consisting of isopropanol, isobutanol, sec-amyl alcohol, cyclohexanol and 2-ethylhexanol.

4. The process according to claim 1, wherein said epoxide is selected from the group consisting of ethylene oxide, propylene oxide, butylene oxide, epichlorohydrin, methyl glycidyl ether, ethyl glycidyl ether and butyl glycidyl ether.

* * * * *